Sept. 20, 1971 H. S. FOSTER ET AL 3,605,299
ADJUSTABLE SPRAYER IRON
Filed May 14, 1969 3 Sheets-Sheet 1

Inventors:
Harold S. Foster,
Wendell C. Walker.

by *John F. Cullen*
Attorney

Sept. 20, 1971   H. S. FOSTER ET AL   3,605,299
ADJUSTABLE SPRAYER IRON

Filed May 14, 1969   3 Sheets-Sheet 2

Inventors:
Harold S. Foster,
Wendell C. Walker by John F. Cullen
Attorney

Sept. 20, 1971   H. S. FOSTER ET AL   3,605,299
ADJUSTABLE SPRAYER IRON
Filed May 14, 1969   3 Sheets-Sheet 3

Inventors:
Harold S. Foster,
Wendell C. Walker
by *Jam F. Cullen*
Attorney

United States Patent Office 3,605,299
Patented Sept. 20, 1971

3,605,299
ADJUSTABLE SPRAYER IRON
Harold S. Foster, Ontario, and Wendell C. Walker, Alta Loma, Calif., assignors to General Electric Company
Filed May 14, 1969, Ser. No. 824,591
Int. Cl. D06f 75/06, 75/22
U.S. Cl. 38—77.83                                   20 Claims

ABSTRACT OF THE DISCLOSURE

The disclosure shows a spray iron having an adjustable sprayer assembly with means to vary the liquid flow rate through a sprayer when the button that actuates the sprayer is manually operated.

BACKGROUND OF THE INVENTION

(1) Field of the invention

This invention relates to a spray iron and more particularly to and adjustable sprayer iron whereby an adjustment means varies the liquid flow rate through the sprayer when the manually operated sprayer control means is actuated.

(2) Description of the prior art

With the advent if irons using distilled or tap water for either steam or spray purposes or both, a liquid reservoir in the form of a water tank is generally provided in the iron above the soleplate and a water valve structure provides controlled water drippage into a steam generator where the water is evaporated and directed out steam holes in the soleplate to steam the article. Spray attachments have been added to such irons to supply a fine spray from the water tank to spray onto the garment. Such spray attachments may be manual, where each actuation of a suitable button pumps a spurt of water, or the spray may be steam powered where, by suitable valving, the steam pressure is raised and directed to the spray where it aspirates and pressurizes the water so that a single depression of the button provides a continuous spray until the button is released. A typical powered spray iron of this type is shown in U.S. Pat. 3,041,757 of common assignment. In steam irons which have the spray feature, the irons have proven to be extremely useful in the ironing of unsprinkled clothes and the occasional re-dampening of troublesome spots during ironing. The amount of moisture in the spray or the spray rate of such irons, however, is generally a compromise between a dry or light spray suitable for light fabrics, such as synthetics, to a medium spray suitable for woolens or medium weight cottons, to the heavier wet spray desirable for heavy cottons and linens. Operators differ widely as to what is the proper spray rate for the different materials. For example, a single rate spray iron tends to provide too much liquid on the fabric when synthetics are ironed and it provides insufficient moisture for heavy cottons and linens. Inasmuch as the fabrics being ironed require different amounts of spray and the operators, even on the same materials, differ as to the proper amount of spray, the usual single rate iron is a compromise to meet these variable conditions.

Prior art construction has not provided a design with an adjustable sprayer assembly to vary the spray rate and thus meet a wide range of requirements of fabrics and operators.

SUMMARY OF THE INVENTION

Briefly described, the present invention is directed to a steam and adjustable or variable rate spray iron that has a water reservoir and steam generator connected to receive water from the reservoir and direct steam through the soleplate to the ironing surface and which also uses a sprayer assembly with a sprayer head connected to direct water and steam through a spray outlet to the ironing surface. The sprayer assembly has a steam tube with a spray discharge outlet and a water tube that has a discharge orifice adjacent the spray outlet. The spray operation is controlled by a cap slidably mounted over the tubes to open and close the outlet. The cap is operated by a lever means connected to it and pivoted between its ends in the handle of the iron where it is operated by a manual control means in the form of a button on the handle and connected to the lever means. For initial proper setting of the sprayer, a tolerance compensating means is preferably disposed in the lever to adjust the cap movement with respect to the control means which operates in an up-and-down direction to actuate the sprayer. Additionally, the same control means may be designed to rotate so that it acts as an adjustment means for the lever to control the liquid flow rate through the orifice of the water tube. The orifice of the water tube may be varied in any suitable manner and conveniently by a pin connected to enter the orifice and control the liquid flow therethrough. The pin may also be tapered to provide an infinite flow rate control or may be stepped to provide finite control rates. Thus, the main object of the invention is applicable to a spray iron of any kind whether powered or manual, and is directed to providing a sprayer assembly adjustment means to vary the liquid flow rate through the sprayer head when the sprayer control means is actutated.

BRIEF DESCRIPTION OF THE DRAWING

Referring to FIG. 1, an iron embodying this invention typically includes a soleplate 10, connected cover 12, and operating handle 14. In accordance with conventional practice, soleplate 10 may be cast from aluminum with an electrical heating element cast into position. The heating element preferably is of the sheathed type in which an electrical resistance element 16 extends through an outer tubular protective sheath with the heating element separated from the outer sheath by an electrical insulating compound resistant to heat such as a mass of granulated and compressed magnesium oxide. The temperature of the soleplate is set by temperature control knob 17 connected to operate at thermostat all as well-known in the art. In the usual manner, the heating element extends in a loop from the rear of the iron along one side to the forward or pointed end and then rearwardly along the other side. Thus, a substantially uniform heat distribution is provided, especially when an aluminum soleplate or coated soleplate is employed.

Figure 1:
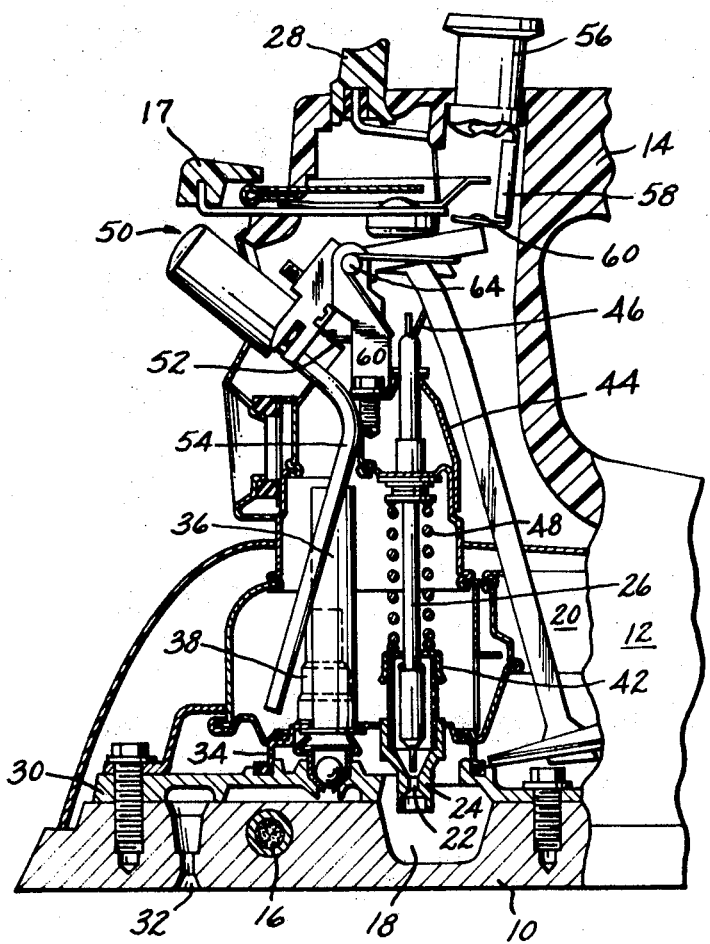
FIG. 1 is a side elevation, partially in section, showing the location of the invention in a flat iron.

Since spray irons are generally found in combination with steam irons, it is in this context that the invention is described. The iron includes means for generating vapor under pressure and typically, this may be used to convert liquid such as water into steam and the invention is so described although the term is intended to cover any liquid. For steam generation, soleplate 10 is provided with a steam generator in the form of cavity 18. A liquid reservoir in the form of water tank 20 supplies water to orifice 22 in valve body 24 which is controlled by valve stem 26 that is actuated by stepped button 28 by suitable known linkage mechanism whereby water drips onto the hot soleplate and is converted into steam. The steam so generated to confined and directed over the heated upper surface of the soleplate by cover plate 30 and thence out steam outlets 32. A steam collecting dome 34 is tightly sealed to cover plate 30 in any suitable fashion and also supports various components of the iron including valve body 24. It also carries a pressure balancing tube 36 which transmits the pressure from the steam generator to the upper portion of the water tank 20. All connections to the steam dome are liquid tight, accomplished by brazing, metal spinning, or other well-known techniques. Generally, uniform operating steam pressure is maintained by a steam pressure regulator 38 which determines the pressure under which the liquid spray nozzle operates. A regulator of this type is shown in U.S. Pat. 3,041,757 of common assignment. Steam produced in generator 18, as controlled by regulator 38, is directed upwardly for downward flow through the pressure regulator and thence through steam outlets 32 to the ironing surface. The pressure regulator 38 maintains a small pressure suitable for spray operation.

In order to equalize pressure throughout the system, pressure balancing tube 36 extends above the water line in tank reservoir 20 to ensure that the same steam pressure exists in the upper portion of the tank as in steam cavity 18.

For maximum use in various operations, the iron should be operable as a dry iron, as a steam iron, or as a liquid sprayer. Therefore, means are provided for controlling whether or not steam is generated within the iron. This includes the elongated valve stem 26 guidedly carried in apertured tubular guide 42 and the top of filler cap 44 to connect with formed rod 46 to the stepped steam button 28 in the handle. Valve stem 26 is urged upwardly by suitable spring 48, which may be compressed when button 28 is depressed, and the stepped portion of button 28 is locked under the handle surface whereby stem 26 closes orifice 22 and the iron is operable as a dry iron.

To spray water on fabric, there is provided a sprayer assembly including a liquid sprayer head generally shown at 50, arranged within the iron handle and partially extending through an opening within the handle. Preferably, the sprayer is directed in a generally downward direction so that the fabric being ironed can be dampened without lifting the iron. The spray head is sealed to steam conduit 52 extending through filler cap 44 which conduit extends upwardly from the water tank. It can be seen from FIG. 1 that steam conduit 52 is aligned with pressure balance tube 36 so that conduit 52 is in relatively and desirable direct communication with the steam generator. Also connected with the sprayer head 50 is a water tube 54 communicating at its lower end with the bottom of the tank 20, and at its upper end with the sprayer 50.

The sprayer assembly may use a manual spray in which a manual control means in the form of button 56 operates a known-type pump not shown on each individual actuation of the button whereupon a slug of water is pumped up the water tube and out of the sprayer. This requires a repetitive pumping action and is shown in U.S. Pat. 3,183,611 of common assignment. On the other hand, a powered sprayer assembly of the type described herein requires only a single operation of button 56 whereupon liquid issues from sprayer 50 as long as the button is held down so no pumping is required. The invention is applicable to either type whether manually or power operated.

Figure 2:
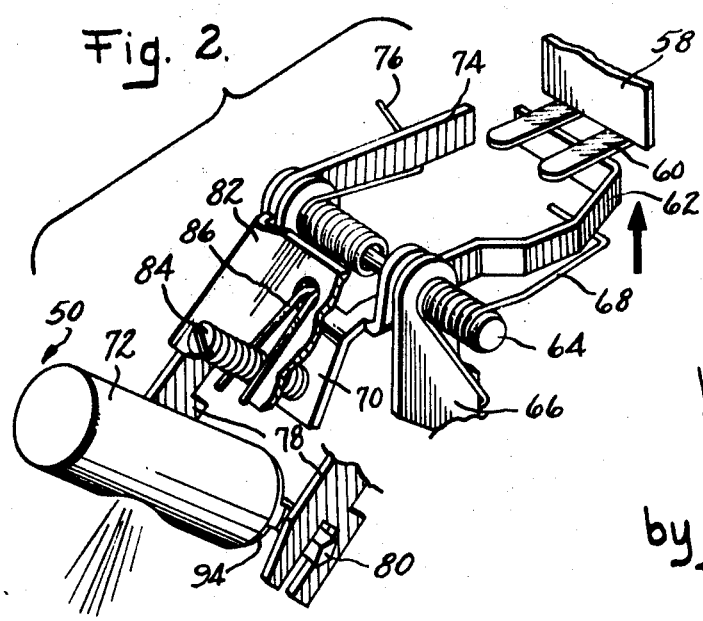
FIG. 2 is a partial broken perspective view of the tolerance compensating means.

In the mass production of flatirons, dimensional tolerances are always provided so that parts may be interchangeable. In assembling these devices, however, the accumulation of dimensional tolerances make is difficult, if not impossible, to be assured of the exact position of one member with respect to another member. In order to compensate for this, it is customary to provide flexible members such as springs which compensate for the dimensional differences. In order to provide the variable rate spray structure and accurately set it from one iron to the next on the assembly line, the invention includes, in the sprayer assembly, a tolerance compensating means preferably in the lever mechanism between spray button 56 and its operated sprayer 50. This is provided to eliminate the tolerances after assembly and permit the initial correct setting of the adjustable spray since, in the invention, more than one spray setting is possible. Any suitable linkage may be used to transmit motion from the button to the sprayer. In a convenient form to transmit the button motion, the button is designed to contact sliding angle member 58 which may slide in suitable slots in the handle and thus moves up or down as the button is operated. Disposed below the arm 60 of angle member 58 is one end of a lever structure generally shown in FIG. 2. This lever structure may comprise a first lever 62 that is shaped or formed generally one-sided as shown and is mounted between its ends for rotation on pivot 64 which, in turn, is mounted on upstanding fixed support 66 within the handle. A suitable torsion spring 68 is provided to urge lever 62 upward against arm 60 as shown by the arrow. This single or one-sided first lever 62 has a flattened bearing surface 70 on the other side of the pivot for a purpose to be explained. The sprayer 50 has an apertured cap 72 that is designed to be raised to uncover or open a spray outlet as will be apparent in FIGS. 3–6. Movement of cap 72 is provided by a second lever 74 that is similarly biased by spring 76 on one side of the pivot and has a pair of bifurcated arms 78 engaging ears 80 as shown in FIG. 2. Second lever 74 is provided with a flat portion 82 in which set screw 84 is frictionally retained by spring 86 and bears against bearing surface 70 on first lever 62. Thus, it will be seen that the longitudinal movement of cap 72 is against the springs which bias the button 56 and the movement may be varied within limits by adjustment of set screw 84 in the lever means whereby the ends of the lever structure and thus the cap and control button are adjusted relative to one another. As previously stated, a tolerance compensating means is required because of the different spray rates available in the present invention and the specific lever structure just described is merely a convenient execution of a satisfactory compensating means. Other structure will suggest itself to achieve the same end.

Figure 3:
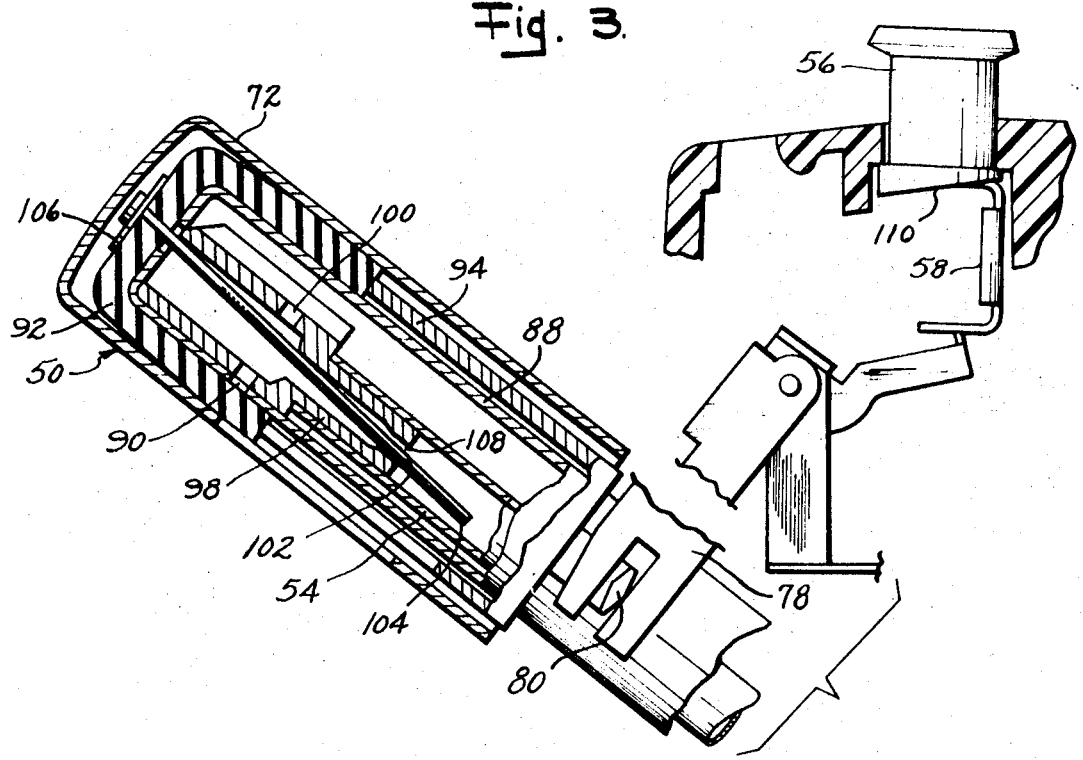
FIG. 3 is a semi-diagrammatic showing of the spray assembly with the sprayer, enlarged for clarity, in the "off" position of a light spray setting.

A variety of nozzle sprayer assemblies may be employed and typical modifications of such sprayers are shown in U.S. Pat. 3,041,757 of common assignment. Generally, referring to FIG. 3, the assembly includes a steam tube 88 which is really an extension of and has its lower end attached and opening into steam conduit 52. In the upper portion steam tube 88 is provided with a spray discharge outlet 90 which is normally directed down onto the surface directly in front of the iron with the sprayer extending beyond the front of the handle as seen in FIG. 1. Spray direction is indicated by the spray lines in FIG. 4 because the sprayer is closed in FIG. 3. The outlet 90 is controlled by the movement of cap 72 which moves together with an internal tubular gasket member 92 of a resilient material such as silicone rubber and which is in frictional engagement with the cap. Movement of the cap and gasket together is provided by a lifting mechanism that may be an additional tube 94 abutting the bottom of gasket 92 as shown in FIG. 3. Thus, movement of tube 94 carries gasket 92 and, by friction, cap 72 into the upper position shown in FIG. 4 where spray discharge outlet 90 is uncovered and spraying occurs as shown. For positive lifting to open position, the tube 94 carries ears 80 which serve as the conection between the sprayer and the lifting mechanism as shown in FIG. 2. Ears 80 are straddled by the bifurcated arms 78 forming the other end of the tolerance compensating means previously described as shown in FIG. 2.

Figure 4:
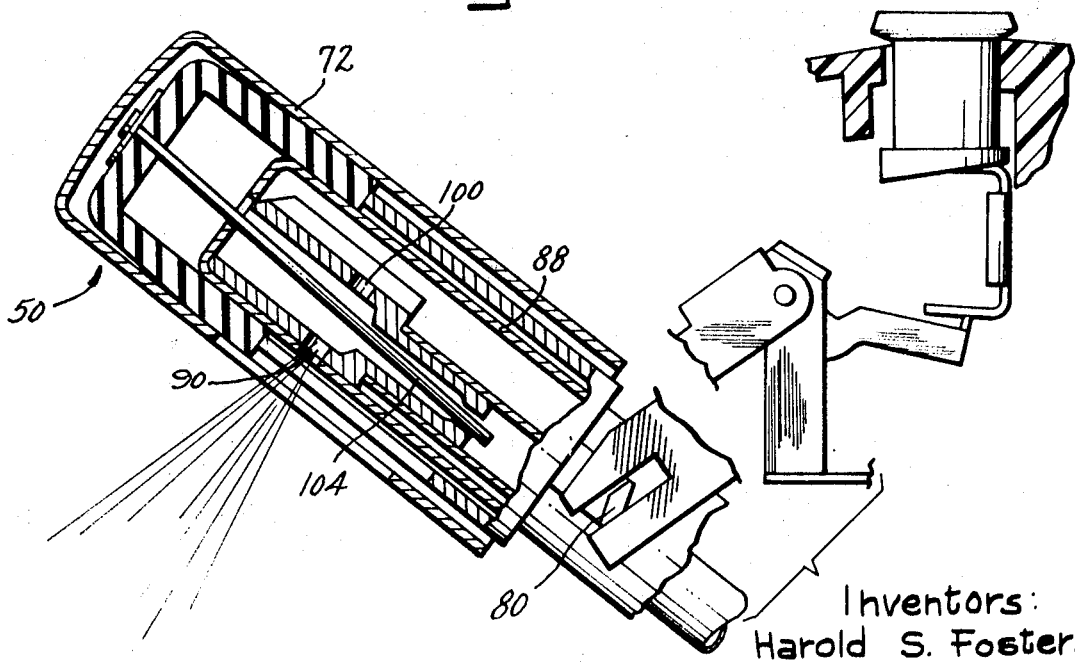
FIG. 4 is a view, similar to FIG. 3, showing the spray assembly in the "on" position of a light spray setting.

Referring again to FIG. 3, water is introduced into the spray, by providing the uper end of water tube 54 with a fixed spray mixing member 98 that acts as an extension of the water tube. Mixing member 98 has a suitable diametrical passage 100 opening into spray outlet 90 as shown to provide water for the spray. When cap 72, covering the steam and water tubes, is slidably raised from its closed or sealed position with gasket 92 covering outlet 90 as shown in FIG. 3, it opens the outlet 90 for spray operation as shown in FIG. 4. In this position, steam flows upwardly in steam tube 88 through passage 100 and through the outlet 90 onto the surface to be sprayed. As high speed steam travels through the passage 100 in the upper end of water tube 54, the aspiration effect causes water to be drawn upwardly through the tube into the outlet 90 and to be discharged as a fine liquid spray of steam and water. Of course, cap 72 and lifting tube 94 have suitable openings in a known manner so as not to hinder the spray flow. In addition to the aspirating effect, the steam pressure in water tank 20 also tends to force the water up tube 54 towards the passage 100.

In order to control the quantity of water, mixing member 98 is formed with metering orifice 102 that, relatively speaking, is adjacent the spray outlet 90, since it controls the water flow to outlet 90. Orifice 102, if desired, may be conveniently formed in a reduced diameter section of mixing member 98 for purposes as disclosed and claimed in copending application Ser. No. 855,081 filed Dec. 15, 1969, of common assignment whereby the orifice may be used to control the deposition of mineral deposits which are subsequently cleaned.

Figure 7:
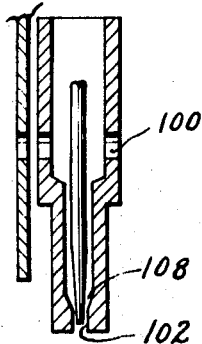
FIG. 7 is a partial view internally of the sprayer showing the use of a tapered pin.
Figure 8:
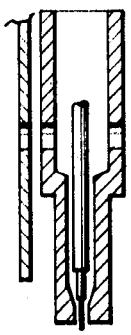
FIG. 8 is a view, similar to FIG. 7, showing the use of a stepped pin.
Figure 6:
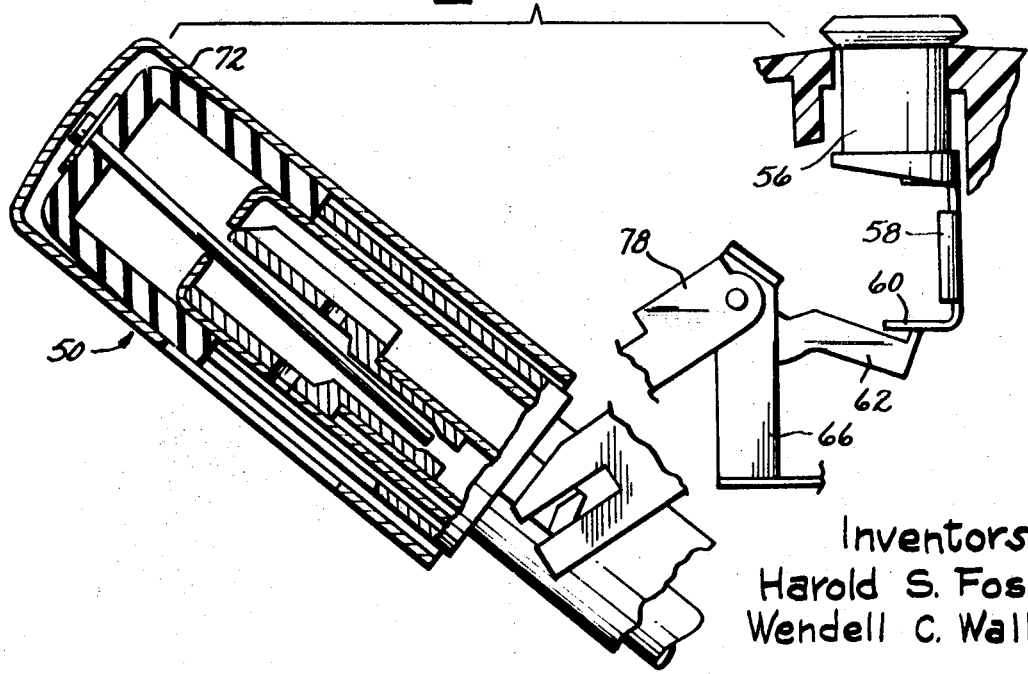
FIG. 6 is a view, similar to FIG. 5, showing the spray assembly in the "on" position of the heavier spray setting.

In order to control the water flow through orifice 102 and subsequently adjust the flow rate from spray outlet 90, a convenient pin 104 is provided which may be suitably fastened to any of the structure that is movable on each actuation of the sprayer. Thus, the pin may be carried within cap 72 by a suitable fastener 106 for operation in a first direction of up-and-down motion of the gasket as actuated by button 56 from the closed position of FIG. 3 to the open position of FIG. 4 to locate the pin relative to orifice 102. The control of water flow through orifice 102 is provided by dimensioning pin 104 of smaller cross section than the orifice to provide an annulus 108 between the pin and the orifice walls. The cross sectional area of the annulus thus determines the flow through the orifice. For wide flow variation, it will be apparent that various pin arrangements may be used. For example, a tapered pin as shown in FIG. 7 provides an infinite variation in the annulus flow area whereas a stepped pin as shown in FIG. 8 provides finite annular flow areas depending on the longitudinal position of the pin with respect to the orifice. A two position—controlled light and heavy spray—may be selected by a single pin of constant diameter which is suitably adjusted longitudinally to vary the flow through the orifice by merely being in the orifice with a small annular passage therearound, as shown in FIG. 4 for a light spray or, being completely withdrawn to allow full flow or heavier spray through the orifice, as shown in FIG. 6. If additional settings are desired, the modifications of FIGS. 7 and 8 may be employed.

In order to independently adjust the liquid flow rate through the sprayer, a convenient single control may be used as diagrammatically shown in FIGS. 3–6. Referring to FIG. 3, motion in a first or up-and-down direction is obtained by supplying the bottom of button 56 with a circular cam surface 110 which bears on angle member 58 as shown. Thus up-and-down movement of button 56 from the position of FIG. 3 to that of FIG. 4 is designed to provide a small movement to pin 104 and leave it in the orifice for a light spray when the sprayer is opened as shown in FIG. 4.

Figure 5:
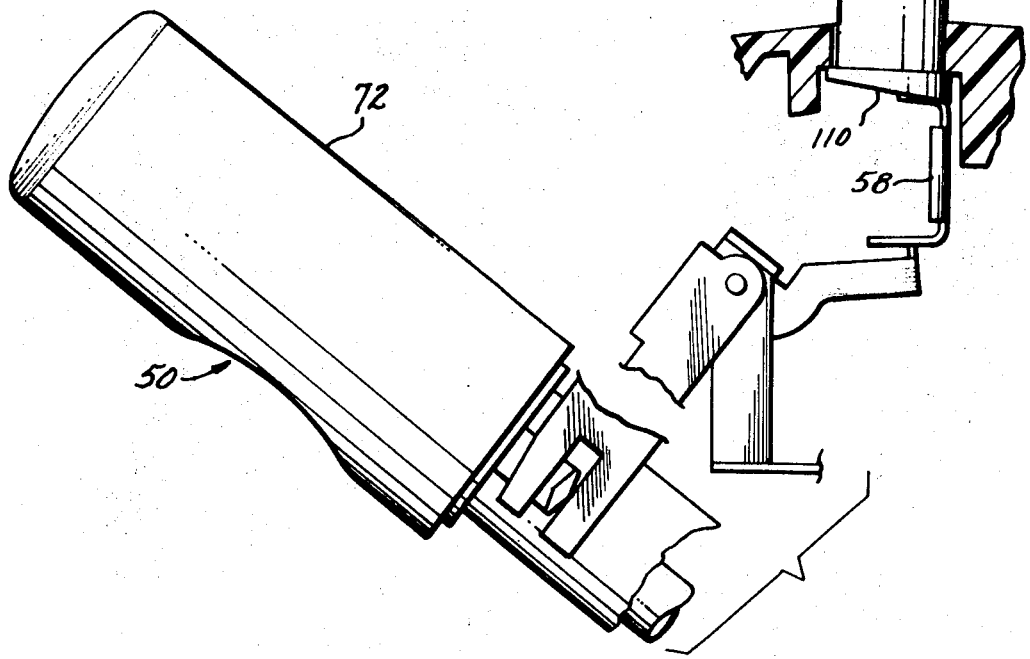
FIG. 5 is a view, similar to FIG. 3, showing the spray assembly in the "off" position of a heavier spray setting.

An additional or heavy spray may be obtained by the same control by moving it in a second direction or rotating it whereby cam 110 is turned to the position of FIG. 5 to provide a larger longitudinal motion to cap 72 to thus withdraw the pin completely from the orifice, as shown in FIG. 6. In this position the orifice is completely open and more water flows through it and out the outlet to increase the rate for a heavier spray. It should be noted that the described adjustment means, while conveniently but not necessarily on the same control, is thus adjustable independently of the manual spray control and operable when the manual spray control is actuated. Of course, other means may be employed to adjust the longitudinal movement of pin 104 and the illustrated linkage structure is merely a simple execution whereby the same control moves in two directions for the dual function so that the orifice can be adjusted for any flow rate depending on the pin configuration used and its position relative to the orifice. Cam 110 may have notches or depressions in its surface as shown to provide a "feel" for the different rate selections.

As noted, because of the plural and variable spray settings, it is important that pin 104 be properly adjustable so that the different spray settings are consistent from iron to iron. This is accomplished by simple adjustment of the tolerance compensating means of FIG. 2. After assembly, the spray knob 56 is turned to the regular or wet position of FIG. 5. The set screw 84 is then rotated until it just contacts bearing surface 70 on the first lever 62. Thus, all the tolerance is taken up in this position of spray button 56 and any movement of the spray button then immediately lifts cap 72. With this simple factory adjustment, the two spray settings of the FIGS. 3 and 5 position are then correct and result in the same flow rate settings from one iron to the next. If the modifications of FIGS. 7 and 8 are used, the adjustment is made in the same manner.

Thus, it will be apparent that the arrangement shown and described provides a variable rate spray iron of two or more positions, depending on the selection of the orifice-controlling pin, with the selected flow rate conveniently determined by the same control means that operates the sprayer. Importantly, the tolerance compensating adjustment provides a means whereby irons may be repetitively set so that, in mass production, each iron reproduces the desired settings exactly. A simple cam and linkage arrangement ensures a compact package to achieve the spraying and/or flow rate desired whereby the single control means both operates as the sprayer control and as the adjustment means to vary the spray rate when the control means is actuated.

While there have been shown preferred forms of the invention, obvious equivalent variations are possible in light of the above teachings. It is therefore to be understood that, within the scope of the appended claims, the invention may be practiced otherwise than as specifically described and the claims are intended to cover such equivalent variations.

We claim:

1. In a spray iron having liquid reservoir and a sprayer assembly connected thereto to apply liquid to the fabric being ironed, said sprayer assembly comprising:
   a sprayer for directing liquid to the fabric,
   manually operated control means connected to actuate the sprayer, and
   adjustment means connected to said sprayer to select the liquid flow rate through said sprayer when said control means is actuated.

2. Apparatus as described in claim 1 where said manual control means and said adjustment means are connected for independent operation of said sprayer.

3. Apparatus as described in claim 1 where said control means is movable in a first direction to actuate the sprayer and in a second direction to vary the spray rate.

4. Apparatus as described in claim 3 where said control means is a button that is depressed to actuate the sprayer and is rotated to vary the liquid flow rate.

5. In a steam and variable rate spray iron having a closed water reservoir and a steam generator connected to receive water from said reservoir and direct steam to the ironing surface and a sprayer assembly connected to direct water through an outlet to the ironing surface, said sprayer assembly comprising:
   a sprayer for directing water,
   a steam tube having a spray discharge outlet,
   a water tube having a metering orifice adjacent said spray outlet,
   a cap slidably mounted over said tubes to open and close said outlet,
   manually operated control means connected to actuate said cap, and
   adjustment means connected to select the flow rate from said outlet when the control means is actuated.

6. Apparatus as described in claim 5 wherein the adjustment means is operative to control the water flow through said orifice of the water tube.

7. Apparatus as described in claim 5 wherein the control means is connected to operate in a first direction to actuate said sprayer and in a second direction as said adjustment means to vary the spray rate.

8. Apparatus as described in claim 5 wherein the control means is a button that is depressed to operate said spray outlet and is rotated to vary the spray rate.

9. Apparatus as described in claim 6 wherein the control means is connected to operate in a first direction to actuate said sprayer and in a second direction as said adjustment means to vary the spray rate.

10. Apparatus as described in claim 6 wherein the control means is a button that is depressed to operate said spray outlet and is rotated to vary the spray rate.

11. Apparatus as described in claim 6 wherein the adjustment means includes a pin of smaller cross section than said orifice to provide an annulus therebetween, said pin being connected to move with said cap relative to said orifice to vary the orifice area and the water flow rate therethrough.

12. Apparatus as described in claim 11 wherein said pin is tapered to move in said orifice.

13. Apparatus as described in claim 11 wherein said pin is stepped to move in said orifice.

14. In a steam and variable rate spray iron having a closed water reservoir and steam generator connected to receive water from said reservoir and direct steam to the ironing surface, and a sprayer assembly connected to direct water through an outlet to the ironing surface comprising:
   a sprayer for directing water,
   a steam tube having a spray discharge outlet,
   a water tube having a metering orifice adjacent said spray outlet,
   a cap slidably mounted over said tubes to open and close said outlet,
   lever means connected to said cap,
   pivot means for mounting said lever means between its ends within the handle of said iron,
   manually operated control means on said handle and connected to said lever means to slidably operate said cap,
   tolerance compensating means to adjust the cap movement with respect to the control means, and
   adjustment means connected to select the flow rate from said outlet when the control means is actuated.

15. Apparatus as described in claim 14 wherein the tolerance compensating means is disposed in said lever means to adjust the ends of said lever relative to one another, and
   said adjustment means is operative to control the water flow through said orifice of the water tube.

16. Apparatus as described in claim 15 wherein the control means is connected to one end of said lever to operate in a first direction to slide said cap and in a second direction as said adjustment means to vary the spray rate.

17. Apparatus as described in claim 16 wherein said control means is a spring-biased button that is depressed to open said spray outlet and is rotated to vary the spray rate.

18. Apparatus as described in claim 17 wherein the adjustment means includes a pin of smaller cross section than said orifice to provide an annulus therebetween, said pin being connected to move with said cap relative to said orifice on lever movement to vary the orifice area and the water flow rate therethrough.

19. Apparatus as described in claim 18 wherein said pin is tapered to move in said orifice.

20. Apparatus as described in claim 18 wherein said pin is stepped to move in said orifice.

References Cited
UNITED STATES PATENTS

| | | | |
|---|---|---|---|
| 2,353,426 | 7/1944 | Morton | 38—77.5 |
| 2,810,218 | 10/1957 | Hoecker | 38—77.5 |
| 3,041,757 | 7/1962 | Swenson et al. | 38—77.5 |
| 3,552,046 | 1/1971 | Phifer | 38—77.5 |

PATRICK D. LAWSON, Primary Examiner

U.S. Cl. X.R.

38—77.5